(12) United States Patent
Park et al.

(10) Patent No.: US 11,361,540 B2
(45) Date of Patent: Jun. 14, 2022

(54) METHOD AND APPARATUS FOR PREDICTING OBJECT OF INTEREST OF USER

(71) Applicants: Samsung Electronics Co., Ltd., Suwon-si (KR); Korea Advanced Institute of Science and Technology, Daejeon (KR)

(72) Inventors: Seungin Park, Yongin-si (KR); Hyong Euk Lee, Suwon-si (KR); Sung Geun Ahn, Daejeon (KR); Gee Hyuk Lee, Daejeon (KR); Dae Hwa Kim, Daejeon (KR); Keun Woo Park, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 27 days.

(21) Appl. No.: 16/932,112

(22) Filed: Jul. 17, 2020

(65) Prior Publication Data

US 2021/0271880 A1 Sep. 2, 2021

(30) Foreign Application Priority Data

Feb. 27, 2020 (KR) .................. 10-2020-0024345

(51) Int. Cl.
*G06T 7/174* (2017.01)
*G06V 20/20* (2022.01)
(Continued)

(52) U.S. Cl.
CPC .............. *G06V 20/20* (2022.01); *G06F 3/013* (2013.01); *G06T 7/174* (2017.01); *G06T 7/187* (2017.01)

(58) Field of Classification Search
CPC ......... G06T 7/174; G06T 7/187; G06F 3/013; G06K 9/00671; G06V 10/255; G06V 20/20; G06V 10/25; G06V 40/20; G06V 40/193

See application file for complete search history.

(56) References Cited

U.S. PATENT DOCUMENTS

2010/0189354 A1* 7/2010 de Campos ........ G06K 9/00597
382/190
2014/0184550 A1 7/2014 Hennessey et al.
(Continued)

FOREIGN PATENT DOCUMENTS

JP 2006-172215 A 6/2006
JP 2008-210239 A 9/2008
(Continued)

OTHER PUBLICATIONS

Chan, Jacob et al., "Designing Traffic Signs: A Case Study on Driver Reading Patterns and Behavior", *16th Philipp. Comput. Sci. Congr. Conf.*, Mar. 22, 2016 ( pp. 1-9).
(Continued)

*Primary Examiner* — Syed Haider
(74) *Attorney, Agent, or Firm* — NSIP Law

(57) ABSTRACT

A method and apparatus for predicting an object of interest of a user receives an input image of a visible region of a user and gaze information including a gaze sequence of the user, generates weight filters for a per-frame segmentation image by analyzing a frame of the input image for input characteristics of the per-frame segmentation image and the gaze information, and predicts an object of interest of the user by integrating the weight filters and applies the integrated weight filter to the per-frame segmentation image.

20 Claims, 8 Drawing Sheets

(51) Int. Cl.
*G06T 7/187* (2017.01)
*G06F 3/01* (2006.01)

(56) References Cited

U.S. PATENT DOCUMENTS

| 2014/0247210 | A1* | 9/2014 | Henderek | G06F 3/02 |
| | | | | 345/156 |
| 2015/0177833 | A1* | 6/2015 | Vennstrom | G06T 7/73 |
| | | | | 345/156 |
| 2018/0183986 | A1 | 6/2018 | Smith et al. | |
| 2018/0365877 | A1 | 12/2018 | Watola et al. | |
| 2019/0187788 | A1 | 6/2019 | Swedish et al. | |

FOREIGN PATENT DOCUMENTS

| JP | 2010-120617 A | 6/2010 |
| JP | 2013-105384 A | 5/2013 |
| JP | 2016-62330 A | 4/2016 |
| JP | 2016-122272 A | 7/2016 |
| JP | 2017-219955 A | 12/2017 |
| WO | WO 2010/143377 A1 | 12/2010 |
| WO | WO 2014/103732 A1 | 7/2014 |

OTHER PUBLICATIONS

Martin, Sujitha et al., "Object of Fixation Estimation by Joint Analysis of Gaze and Object Dynamics", *2018 IEEE Intelligent Vehicles Symposium (IV)*, Changshu, Suzhou, China, Jun. 26-30, 2018 (pp. 2042-2047).

Srivastava, Namrata et al., "Combining Low and Mid-Level Gaze Features for Desktop Activity Recognition", *Proceedings of the ACM on Interactive, Mobile, Wearable and Ubiquitous Technologies*, Dec. 2018 (pp. 1-28).

Cao, Yujia et al., "On Timing and Modality Choice with Local Danger Warnings for Drivers", *Proceedings of 1st International Conference on Automotive User Interfaces and Interactive Vehicular Applications, AutomotiveUI 2009, in-cooperation with ACM SIGCHI*, Essen, Germany, Sep. 21-22, 2009 (pp. 1-4).

* cited by examiner

METHOD AND APPARATUS FOR PREDICTING OBJECT OF INTEREST OF USER

CROSS-REFERENCE TO RELATED APPLICATIONS

This application claims the benefit under 35 USC § 119(a) of Korean Patent Application No. 10-2020-0024345 filed on Feb. 27, 2020, in the Korean Intellectual Property Office, the entire disclosure of which is incorporated herein by reference for all purposes.

BACKGROUND

Field

The following description relates to a method and apparatus for predicting an object of interest of a user.

Description of Related Art

If a user views an object within a visible region of the user, useful information may be timely provided to the user on an augmented reality (AR) application image. When the additional information is provided to the user in a timely manner, the user may make a more accurate judgment on circumstances and may have an improved ability to act.

To discern the information necessary for the user, gaze information related to the visible region of the user may be used. The intent of the user and/or the information necessary for the user may be discerned by identifying the gaze information of the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of predicting an object of interest, the method including receiving an input image of a visible region of a user and gaze information including a gaze sequence of the user, generating weight filters for a per-frame segmentation image by analyzing a frame of the input image for input characteristics of the per-frame segmentation image and the gaze information, and predicting an object of interest of the user by integrating the weight filters and applying the integrated weight filter to the per-frame segmentation image.

The weight filters may include any two or any combination of generating a first filter which is based on a gaze location of the user, based on angle of view information and a foveal point of the user in the per-frame segmentation image, generating a second filter which is based on an eye movement of the user, based on an eye movement pattern according to the gaze sequence, and generating a third filter which is based on a gaze duration of the user, based on a duration of a fixation of the user on an object estimated to be a recognition target of the user in the gaze sequence.

The generating of the first filter may include distinguishing a first region corresponding to a fovea and a second region corresponding to a parafovea in the per-frame segmentation image, based on the angle of view information and the foveal point of the user in the per-frame segmentation image, and generating the first filter by assigning different weights to a class estimation probability of a pixel in the first region and a class estimation probability of a pixel in the second region.

The distinguishing may include distinguishing whether each pixel of the per-frame segmentation image belongs to the first region or the second region.

The generating of the first filter by assigning different weights may include generating the first filter by assigning the different weights to the class estimation probability of the pixel in the first region and the class estimation probability of the pixel in the second region, considering a distribution form of human visual receptors.

The generating of the first filter by assigning different weights may include assigning a first weight to a class estimation probability of a first pixel corresponding to the first region, and assigning a second weight to a class estimation probability of a second pixel corresponding to the second region, wherein the first weight is greater than the second weight.

The generating of the second filter may include generating the second filter based on an association between a classification result of the eye movement pattern according to the gaze sequence and a visual form of the object estimated to be the recognition target of the user.

The eye movement pattern may include any one or any combination of a fixation pattern in which a gaze of the user is fixated to the object, a saccade pattern in which the gaze of the user quickly moves from a first fixation point to a second fixation point spaced apart therefrom, and a pursuit pattern in which the gaze of the user pursues the object.

The generating of the second filter may include generating the second filter by assigning a different weight to the object for each eye movement pattern, based on at least one of the visual form of the object estimated to be the recognition target of the user or a type of information contained in the object.

The method may include classifying the gaze sequence for each eye movement pattern through a time series analysis on the gaze sequence.

The generating of the second filter by assigning the different weight to the object may include generating the second filter by assigning a different weight to a class estimation probability of the object for each eye movement pattern, based on at least one of the visual form of the object or the type of information contained in the object in the per-frame segmentation image.

The generating of the third filter may include analyzing the duration of the fixation of the user on the object for each eye movement pattern according to the gaze sequence through a time series analysis on the gaze sequence, and generating the third filter by assigning a different weight to the object, based on an information acceptability of the user according to the visual form of the object and the duration of the fixation of the user for each eye movement pattern.

The predicting of the object of interest of the user may include integrating at least two filters from among the weight filters, and predicting the object of interest of the user by applying the integrated filter to the per-frame segmentation image.

The integrating of the at least two filters may include integrating the at least two filters from among the weight filters using an element-wise multiplication operation.

In another general aspect, there is provided an apparatus for predicting an object of interest, the apparatus including a communication interface configured to receive an input image of a visible region of a user and gaze information including a gaze sequence of the user, and a processor configured to generate a weight filters for a per-frame segmentation image by analyzing a frame of the input image for input characteristics of the per-frame segmentation image and the gaze information, and predict an object of interest of the user by integrating the weight filters and applying the integrated weight filter to the per-frame segmentation image.

The processor may be configured to generate a first filter which is based on a gaze location of the user, based on angle of view information and a foveal point of the user in the per-frame segmentation image, and to generate a second filter which is based on an eye movement of the user, based on an eye movement pattern according to the gaze sequence, or generate a third filter which is based on a gaze duration of the user, based on a duration of a fixation of the user on an object estimated to be a recognition target of the user in the gaze sequence.

The processor may be configured to distinguish a first region corresponding to a fovea and a second region corresponding to a parafovea in the per-frame segmentation image, based on the angle of view information and the foveal point of the user in the per-frame segmentation image, and to generate the first filter by assigning different weights to a class estimation probability of a pixel in the first region and a class estimation probability of a pixel in the second region.

The processor may be configured to generate the second filter based on an association between a classification result of the eye movement pattern according to the gaze sequence and a visual form of the object estimated to be the recognition target of the user.

The processor may be configured to analyze the duration of the fixation of the user on the object for each eye movement pattern according to the gaze sequence through a time series analysis on the gaze sequence, and to generate the third filter by assigning a different weight to the object, based on an information acceptability of the user according to the visual form of the object and the duration of the fixation of the user for each eye movement pattern.

In another general aspect, there is provided a method of predicting an object of interest, the method including receiving an image of a region visible to a user and gaze information of the user, determining a segmentation image from a frame of the image, generating a first filter based on a foveal point and an angle of view information of the user in the segmentation image, generating a second filter based on the gaze information including a gaze sequence indicating eye movements of the user over time, generating a third filter based on the gaze information including a duration of fixation of the gaze of the user on an estimated object of interest of the user, predicting an object of interest of the user by integrating any two or more or any combination of the first filter, the second filter, and the third filer and applying the integrated filter to the segmentation image.

The generating of the first filter may include determining, based on the angle of view information and the foveal point of the user in the segmentation image, a first region corresponding to a fovea and a second region corresponding to a parafovea in the segmentation image, and assigning a first weight to a class estimation probability of a first pixel corresponding to the first region that is greater than a second weight assigned to a class estimation probability of a second pixel corresponding to the second region.

The gaze information may include any one or any combination of a gaze trajectory, a velocity during the eye movements, a coverage of the fixation of the gaze, a time at which the gaze sequence is acquired, and a sampling frequency at the time at which the gaze sequence is acquired.

Other features and aspects will be apparent from the following detailed description, the drawings, and the claims.

Figure 1:
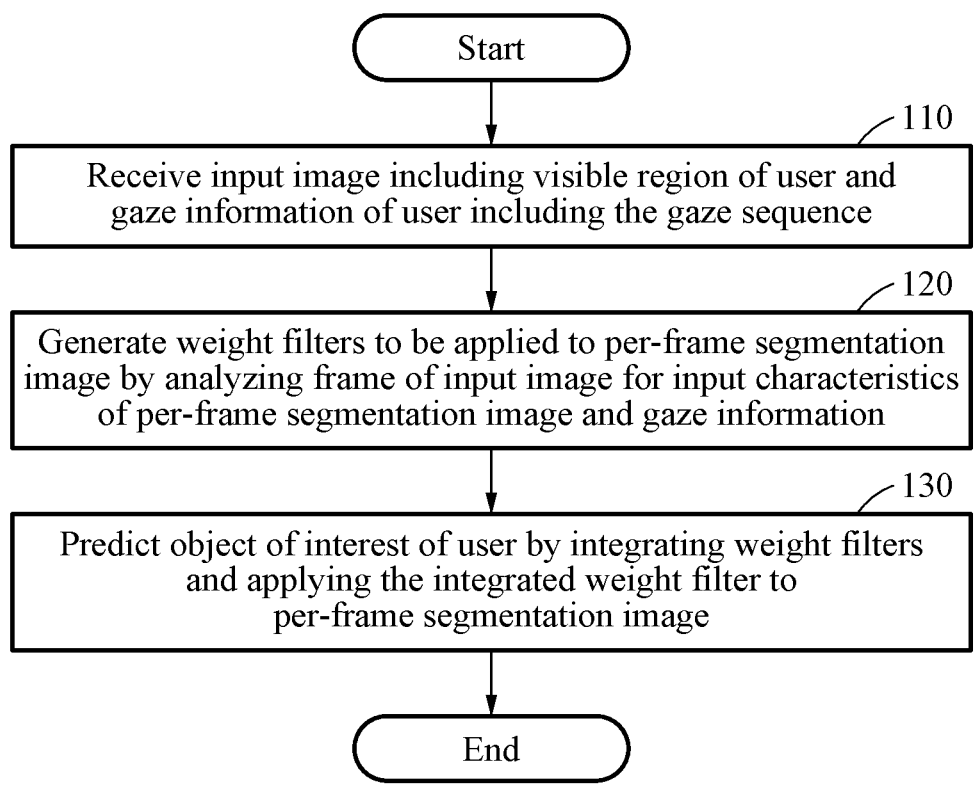
FIG. 1 illustrates an example of a method of predicting an object of interest of a user.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, the examples will be described in detail with reference to the accompanying drawings. Like reference numerals in the drawings refer to like elements.

FIG. 1 illustrates an example of a method of predicting an object of interest of a user. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions.

Figure 2:
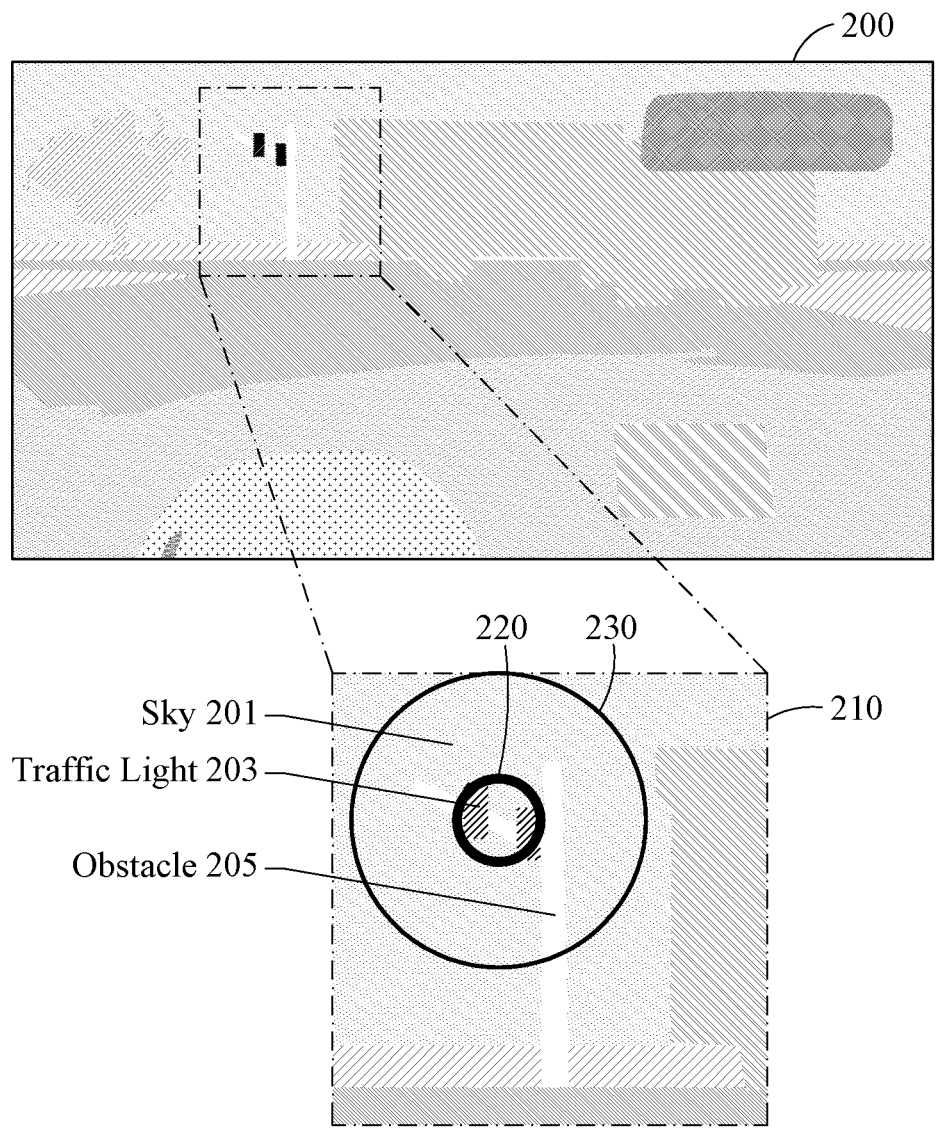
FIG. 2 illustrates an example of generating a first filter.

Referring to FIG. 1, in operation 110, an apparatus for predicting an object of interest of a user (hereinafter, the "prediction apparatus") receives an input image of a visible region of a user and gaze information including a gaze sequence of the user. Here, the visible region of the user refers to a region that is visible to the user. The input image is an image acquired by capturing the visible region of the user, and may be, for example, a two-dimensional (2D) or three-dimensional (3D) image including a plurality of image frames. The input image may include, for example, information related to a point in time at which the input image is acquired and/or information related to a sampling frequency at the point in time at which the input image is acquired. For example, the prediction apparatus may generate a per-frame segmentation image 200 as shown in FIG. 2, by performing an image analysis on the input image.

Further, the gaze information may include the gaze sequence indicating eye movements of the user over time. The gaze information is sequence information that is continuously input, and a time series analysis may be performed on the input. In an example, the gaze sequence may include information related to eye movements of the user accumulated over time. The gaze sequence may correspond to, for example, gaze information of the user mapped to the input image. The gaze sequence may include, a variety of temporal information, such as, for example, a gaze trajectory, a velocity during eye movements, information related to a fixation, a duration of the fixation, and a coverage of the fixation. The gaze trajectory may also be referred to as a "scan path" of the gaze. The gaze sequence may include, for example, information related to a point in time at which the gaze sequence is acquired and/or information related to a sampling frequency at the point in time at which the gaze sequence is acquired. The sampling frequency at the point in time at which the input image is acquired may be the same as or different from the sampling frequency at the point in time at which the gaze sequence is acquired.

In operation 120, the prediction apparatus generates a plurality of weight filters to be applied to a per-frame segmentation image by analyzing a frame of the input image for input characteristics of the per-frame segmentation image and the gaze information. Here, the "input characteristics" of the segmentation image and the gaze information may include, for example, a foveal point and angle of view information of the user in the segmentation image, an eye movement pattern according to the gaze sequence, and a fixation duration in the gaze sequence, but are not limited thereto.

In operation 120, the prediction apparatus generates the plurality of weight filters. The prediction apparatus may generate a first filter which is based on a gaze location of the user, based on angle of view information and a foveal point of the user in the per-frame segmentation image. The first filter may also be referred to as a "location weight filter" in assigning a weight based on the gaze location of the user. The prediction apparatus generates the first filter by distinguishing a region corresponding to a fovea at which the gaze of the user is fixated in the per-frame segmentation image based on the foveal point and the angle of view information of the user in the per-frame segmentation image, and assigning a higher weight to a class estimation probability of a pixel of the region. The example in which the prediction apparatus generates the first filter will be described further with reference to FIGS. 2 and 3.

The prediction apparatus generates a second filter based on an eye movement of the user. In an example, the second filter is generated based on an eye movement pattern according to the gaze sequence. For example, the prediction apparatus generates the second filter based on an association between a classification result of the eye movement pattern according to the gaze sequence and a visual form of the object estimated to be a recognition target of the user. Here, the eye movement pattern may include, for example, any one or any combination of a fixation pattern in which a gaze of the user is fixated to the object, a saccade pattern in which the gaze of the user quickly moves from a first fixation point to a second fixation point spaced apart therefrom, and a pursuit pattern in which the gaze of the user pursues the object. In an example, the fixation pattern may occur if an object including pictorial information is recognized. In an example, the saccade pattern may occur if whether there is a recognizable color of object is recognized in a short time. In an example, the pursuit pattern may occur if a text form or a target showing a similar movement (for example, a road sign, a sign, or a signboard including text) is recognized. The second filter may be referred to as an "eye movement association filter" in assigning a weight based on an association with the eye movement of the user or the eye movement pattern. The example in which the prediction apparatus generates the second filter will be described further with reference to FIGS. 4 and 5.

Further, the prediction apparatus may generate a third filter which is based on a gaze duration of the user. In an example, the third filter is based on a duration of a fixation of the user on an object estimated to be a recognition target of the user in the gaze sequence. The third filter may also be referred to as a "gaze duration weight filter" in assigning a weight based on the duration of the fixation of the user. The example in which the prediction apparatus generates the third filter will be described further with reference to FIG. 6.

In an example, the prediction apparatus may generate at least two filters among the plurality of weight filters. In operation 120, the prediction apparatus may generate the first filter and the second filter, generate the second filter and the third filter, or generate the first filter and the third filter. In another example, the prediction device may generate the first filter, the second filter, and the third filter.

In operation 130, the prediction apparatus predicts an object of interest of the user by integrating the plurality of weight filters and applying the integrated weight filter to the per-frame segmentation image. The prediction apparatus may integrate the two or three weight filters generated in operation 120 using, for example, an element-wise multiplication operation. The prediction apparatus may predict the object of interest of the user by applying the integrated filter to the per-frame segmentation image.

FIG. 2 illustrates an example of generating a first filter. Referring to FIG. 2, a segmentation image 200 of a frame of an input image and a result image 210 in which classes of objects are estimated for pixels included in a partial region of the segmentation image 200 are illustrated.

The prediction apparatus may acquire the segmentation image 200 by applying various segmentation techniques to the input image, for an image analysis of the input image with respect to a visible region of the user. In this example, the segmentation techniques may include, for example, semantic segmentation that segments same object classes in the input image as the same color or the same region, and instance segmentation that segments even the same object classes by identifying different instances, but are not limited thereto.

When the prediction apparatus segments the input image with respect to a predefined object class, a probability that each pixel in the image belongs to each object class may be estimated. In this example, a class with the highest probability may be determined as in the result image 210.

Here, the "object class" may correspond to grouping common properties of actual objects into an abstract concept. The object class may include, for example, sky 201, vehicle, pedestrian, traffic light 203, road, and obstacle 205, as shown in the result image 210, but are not limited thereto.

For example, if a segmentation for N object classes is performed on an input image with width W and height H, a W×H×N segmentation result may be obtained. In this example, the W×H×N segmentation result may include, for example, an element of (i, j, k) indicating a probability that a pixel at (i, j) belongs to a k-th class.

The prediction apparatus may determine a class having the greatest probability, among probabilities that each pixel belongs to respective object classes, to be a final class of the pixel, as in the result image 210. In this example, the prediction apparatus may distinguish a first region 220 and a second region 230 in a per-frame segmentation image based on a foveal point and angle of view information of the user, and generate a first filter by assigning a different weight to a class estimation probability of a pixel in each region. An example in which the prediction apparatus distinguishes the first region 220 and the second region 230 will be described further with reference to FIG. 3.

Figure 3:
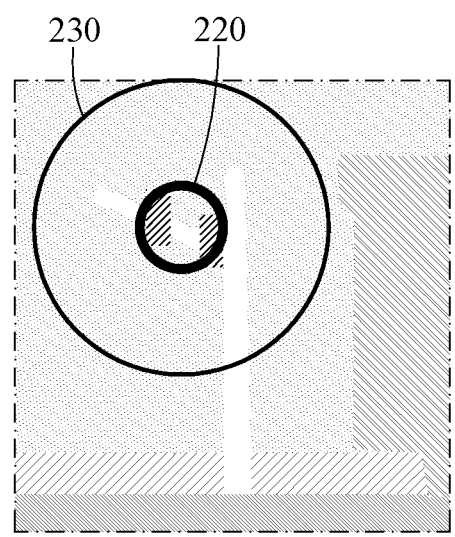
FIG. 3 illustrates an example of distinguishing a first region and a second region in a per-frame segmentation image.
Figure 3:
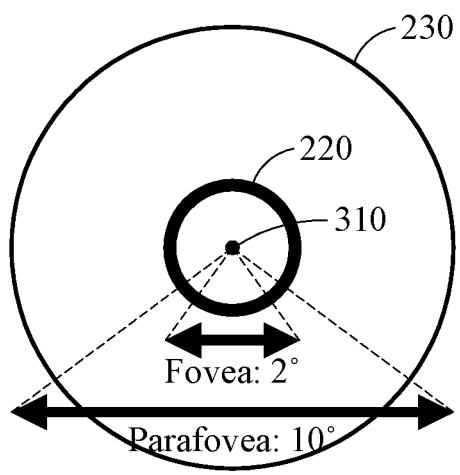

FIG. 3 illustrates an example of distinguishing a first region and a second region in a per-frame segmentation image. Referring to FIG. 3, the first region 220 corresponding to a fovea of the user and the second region 230 corresponding to a parafovea are illustrated.

In an example, the prediction apparatus may distinguish the first region 220 corresponding to the fovea and the second region 230 corresponding to the parafovea in the per-frame segmentation image, based on the angle of view information and the foveal point 310 of the user in the per-frame segmentation image.

The prediction apparatus may distinguish the first region 220 and the second region 230 based on the foveal point 310 at which the gaze is fixated on the per-frame segmentation image. The first region 220 including the foveal point 310 may be referred to as the "foveal region", and the second region 230 may be referred to as the "parafoveal region". In an example, considering that in general, a human eye has a foveal angle of 2° and a parafoveal angle of 10°, a region within a radius of 2° from the foveal point 310 may be calculated as the first region 220, and a region within a radius of 10° from the foveal point 310, except for the first region 220, may be calculated as the second region 230.

The prediction apparatus may distinguish, for each pixel of the per-frame segmentation image, one of the first region and the second region to which the pixel belongs.

In human visual information acceptance, the possibility of recognition and acceptance of the information increases as we get closer to the fovea. Thus, a high weight (for example, a first weight) may be assigned to a class estimation probability for pixel(s) corresponding to the first region 220, and a relatively low weight (for example, a second weight), when compared to the first region 220, may be assigned to a class estimation probability for pixel(s) corresponding to the second region 230. In this example, the first weight may be greater than the second weight. The prediction apparatus may set a different weight for the class estimation probability of the pixel for each region in view of the distribution form of human visual receptors such as a cone and a rod according to a visual cognitive model, or may set a different weight empirically. The prediction apparatus may generate the first filter by assigning different weights to a class estimation probability of a pixel in the first region and a class estimation probability of a corresponding pixel in the second region.

The prediction may finally predict an object corresponding to the greatest probability to be an object of interest of the user by assigning different weights to the class estimation probabilities of the corresponding pixels.

Figure 4:
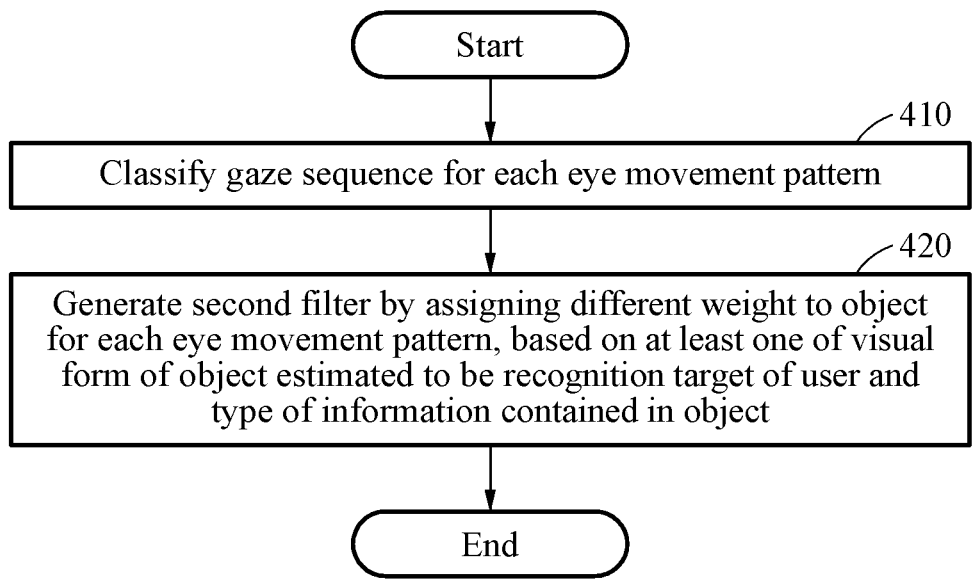
FIG. 4 illustrates an example of generating a second filter.

FIG. 4 illustrates an example of generating a second filter. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, the prediction apparatus may classify a gaze sequence for each eye movement pattern. In this example, the eye movement pattern may not be determined independently, but may be determined based on a visual form of an object to be recognized by the user, i.e., an object estimated to be a recognition target of the user, and a type of information contained in the object. The prediction apparatus may classify the gaze sequence for each eye movement pattern through a time series analysis on the gaze sequence. An example of classifying the gaze sequence for each eye movement pattern will be described further with reference to FIG. 5.

In operation 420, the prediction apparatus may generate the second filter by assigning a different weight to the object for each eye movement pattern, based on at least one of the visual form of the object estimated to be the recognition target of the user and the type of information contained in the object. The prediction apparatus may generate the second filter by assigning a different weight to a class estimation probability of the object for each eye movement pattern, based on at least one of the visual form of the object and the type of information contained in the object in the per-frame segmentation image. For example, it may be assumed that the probability that the user is gazing at a text is high according to the classification for each eye movement pattern. It may also be assumed that there is a road sign in the form including a text, in an e-th class in the object class list according to a result of performing image segmentation. In this example, the prediction apparatus may assign a high weight to an e-th probability that an object corresponds to a road sign.

Figure 5:
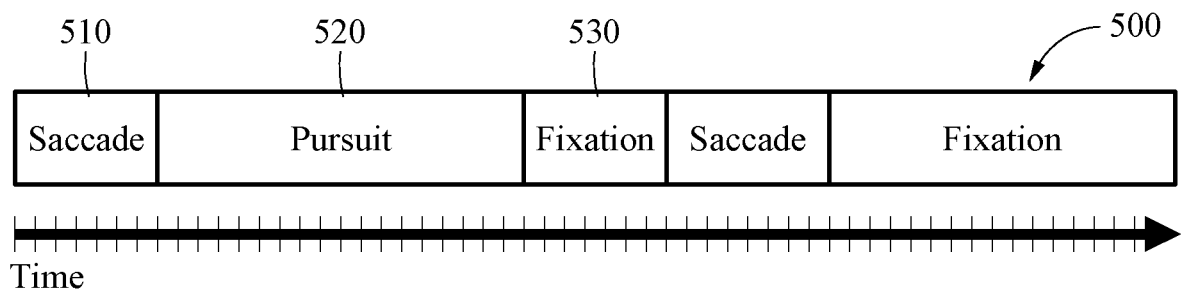
FIG. 5 illustrates an example of classifying a gaze sequence for each eye movement pattern.

FIG. 5 illustrates an example of classifying a gaze sequence for each eye movement pattern. Referring to FIG. 5, a saccade pattern 510, a pursuit pattern 520, and a fixation pattern 530 classified in a gaze sequence 500 are illustrated.

In an example, gaze information of a user is continuously input, and thus the prediction apparatus may classify the gaze sequence 500 for each eye movement pattern according to characteristics of eye movements, by performing a time series analysis on the gaze sequence 500 included in the gaze information.

The prediction apparatus may obtain unit time series division data, as shown in FIG. 5, by dividing the gaze sequence 500 after classifying the gaze sequence 500 according to an eye movement pattern. In this example, the eye movement pattern may not be determined independently, but may be determined based on a visual form of an object to be recognized by the user, i.e., an object estimated to be a recognition target of the user, and a type of information contained in the object.

The fixation pattern in which a gaze of the user is fixated may occur, for example, when the user recognizes an object including pictorial information. The saccade pattern in which the gaze of the user quickly moves from a first fixation point to a second fixation point spaced apart from each other may occur, for example, when the user recognizes whether there is an object or a color recognizable by the user within a short time. The pursuit pattern in which the gaze of the user pursues an object may occur when the user recognizes an object in a text form or showing a similar movement (for example, a road sign, a sign, or a signboard including text).

The prediction apparatus may roughly estimate a form and/or a type of an object to be recognized by the user according to an eye movement pattern. The prediction apparatus may generate the second filter using a classification result for each eye movement pattern based on the rough estimation. In an example, the prediction apparatus may reflect a high weight in an estimation probability of an object estimated to be recognized by the user according to the classification result of the eye movement pattern. In this example, it may be assumed that the input image mapped to the gaze information is segmented to apply the second filter. For example, it may be assumed that the probability that a user is gazing at a pictorial signboard is high according to the classification for each eye movement pattern. The prediction apparatus may reflect a weight in an estimation probability of the pictorial signboard (for example, assumed to belong to a second class) in an object class list according to a result of performing segmentation on the input image, i.e., an estimation probability of the second class in the class list.

Figure 6:
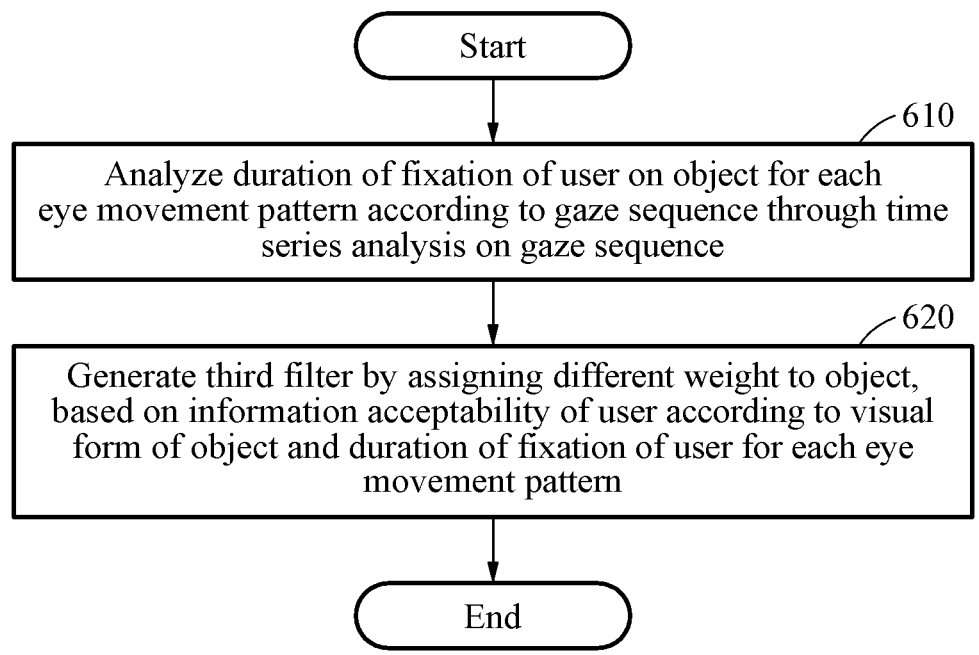
FIG. 6 illustrates an example of generating a third filter.

FIG. 6 illustrates an example of generating a third filter. For example, a minimum time required for recognizing information included in the input image may differ depending on the form of the information. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

For example, to recognize and accept information in the form of text, the prediction apparatus needs to recognize that the information is in the form of text, and read and understand content of the text of the information, and thus, may require a relatively long time (for example, 10 seconds). In another example, the predict apparatus may require an intermediate time (for example, 5 seconds) to recognize and accept pictorial information, and may require a short time (for example, 2 seconds) to recognize whether there is a color or an object.

A different minimum time may be needed to recognize and accept information depending on the form of the information, such that a third filter may be generated by determining whether the probability that the user accepts the information is high or low when compared to a duration of a fixation of the user for each eye movement pattern and assigning a different weight to the object estimated to be the recognition target of the user.

Referring to FIG. 6, in operation 610, the prediction apparatus may analyze the duration of the fixation of the user on the object for each eye movement pattern according to the gaze sequence through a time series analysis on the gaze sequence.

In operation 620, the prediction apparatus may generate the third filter by assigning a different weight to the object, based on an information acceptability of the user according to the visual form of the object and the duration of the fixation of the user for each eye movement pattern.

For example, it may be assumed that a result of analyzing the duration of the fixation of the user on the object for each eye movement pattern according to a 15-second gaze sequence is as follows.

It may be assumed that in the gaze sequence, a duration of the fixation of the user on a first object is 4 seconds in total, from 0 seconds to 4 seconds, in an eye movement having the fixation pattern, and a duration of the fixation of the user on a second object is 1 second in total, from 4 seconds to 5 seconds, in an eye movement having the saccade pattern, and a duration of the fixation of the user on a third object is 10 seconds in total, from 5 seconds to 15 seconds, in an eye movement having the pursuit pattern. Further, it may be assumed that the visual form of the first object estimated to be a recognition target of the user is pictorial information, the visual form of the second object is a color, and the visual form of the third object is textual information.

In this example, although the user requires an intermediate time (for example, 5 seconds) to accept the pictorial information of the first object, the duration of the fixation of the user on the first object is 4 seconds. Thus, the information acceptability of the user with respect to the first object may be $4/5 \times 100 = 80\%$. Further, although the user requires a short time (for example, 2 seconds) to accept the color information of the second object, the duration of the fixation of the user on the second object is only 1 second in total. Thus, the information acceptability of the user with respect to the second object may be $1/2 \times 100 = 50\%$. In addition, the user requires a long time (for example, 10 seconds) to accept the textual information of the third object, and the duration of the fixation of the user on the third object is 10 seconds. Thus, the information acceptability of the user with respect to the third object may be 10/10×100=100%.

The prediction apparatus may generate the third filter, for example, by assigning a weight of 0.8 to the first object, a weight of 0.5 to the second object, and a weight of 1 to the third object, based on the information acceptability of the user according to the visual form of the object and the duration of the fixation of the user for each eye movement pattern.

Figure 7:
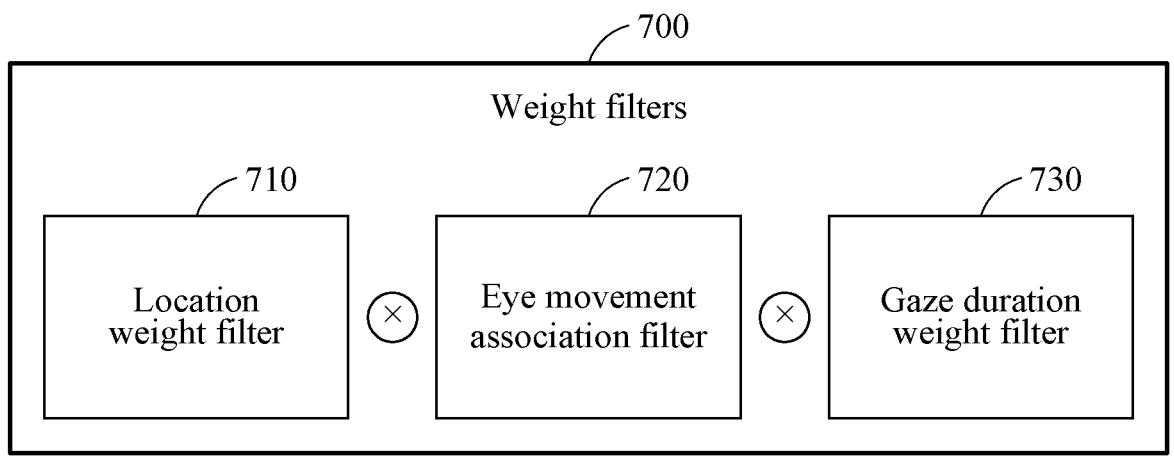
FIG. 7 illustrates an example of integrating a plurality of weight filters.

FIG. 7 illustrates an example of integrating a plurality of weight filters. Referring to FIG. 7, the prediction apparatus may integrate at least two filters from among a plurality of weight filters. For example, as shown in FIG. 7, the prediction apparatus may integrate the plurality of weight filters, such as, a location weight filter 710, an eye movement association filter 720, and a gaze duration weight filter 730, using an element-wise multiplication operation. Here, the element-wise multiplication operation may correspond to, for example, a Hadamard production operation that multiplies components of two matrices of the same size. The prediction apparatus may predict an object corresponding to a class having the greatest probability to be an object of interest of the user by applying the integrated three weight filters 710, 720, and 730 to a per-frame segmentation image.

Figure 8:
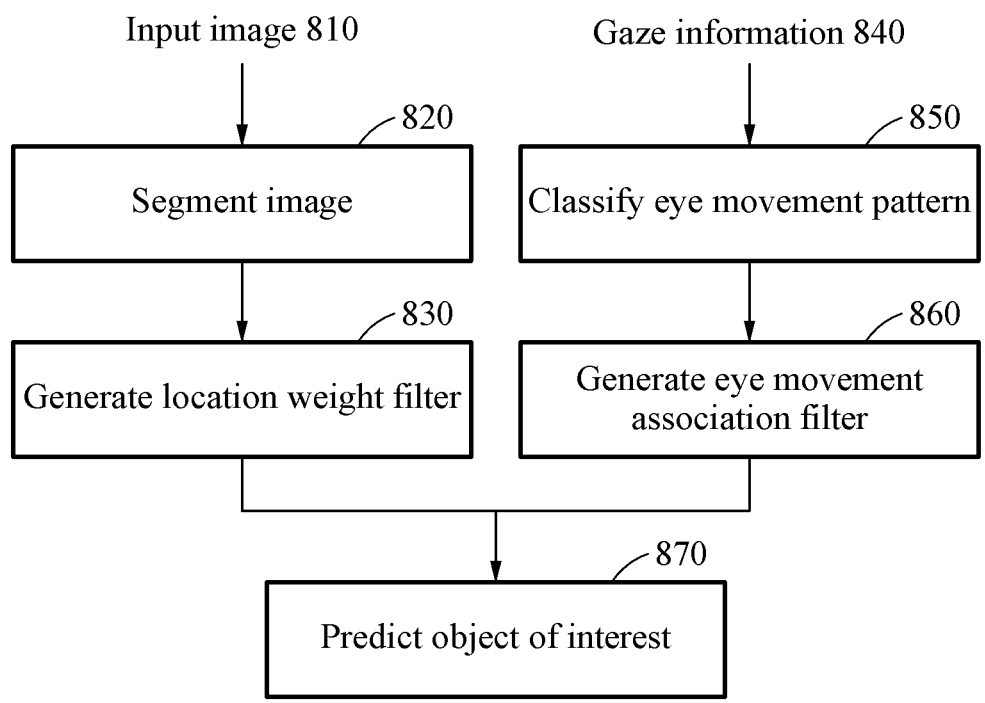
FIGS. 8 and 9 illustrate examples of methods of predicting an object of interest of a user.

FIG. 8 illustrates an example of a method of predicting an object of interest of a user. Referring to FIG. 8, a process of predicting an object of interest of a user when an input image 810 of a visible region of a user and gaze information 840 including a gaze sequence are input into the prediction apparatus is illustrated. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

The prediction apparatus may predict the object of interest by performing a joint analysis based on high-dimensional information obtained after performing an appropriate analysis for each form of information included in each of the input image 810 and the gaze information 840 or each input characteristic of each of the input image 810 and the gaze information 840.

In detail, in operation 820, the prediction apparatus may generate a per-frame segmentation image by performing image segmentation for each frame of the input image 810. In operation 830, the prediction apparatus may generate a location weight filter based on an image segmentation result. The prediction apparatus may generate the location weight filter by distinguishing a first region corresponding to a fovea and a second region corresponding to a parafovea in the per-frame segmentation image, based on a foveal point and angle of view information of the user. In operation 850, the prediction apparatus may classify an eye movement pattern according to the gaze sequence included in the gaze information 840. In operation 860, the prediction apparatus may generate an eye movement association filter based on an association between a classification result of the eye movement pattern and the visual form of the object estimated to be the recognition target of the user.

Meanwhile, in the example of FIG. 8, the input image 810 and the gaze information 840 may be provided as an input at the same time. Thus, operation 820 of generating the per-frame segmentation image from the input image 810 and operation 850 of classifying an eye movement pattern from the gaze information 840 may be performed at the same time or at a predetermined interval.

In operation 870, the prediction apparatus may predict or determine the object of interest of the user by integrating the location weight filter generated in operation 830 and the eye movement association filter generated in operation 860, for example, using the Hadamard production operation and applying the integrated filter to the per-frame segmentation image.

Figure 9:
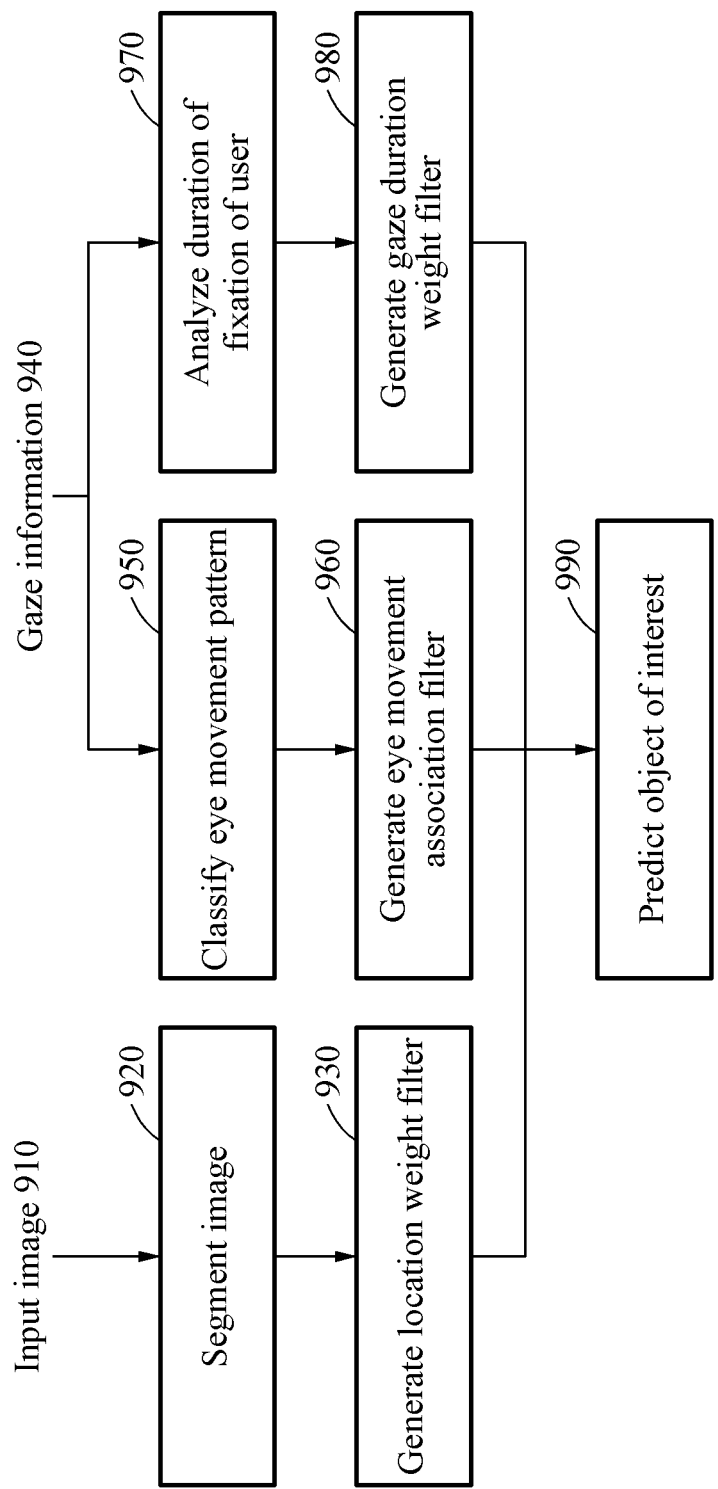

FIG. 9 illustrates an example of a method of predicting an object of interest of a user. In addition to the location based filter and the eye movement association filter described with reference to FIG. 8, an additional filter may be generated through an additional analysis on each input. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions.

The description of operations 910 to 960 of FIG. 9 is similar to the description of operations 810 to 860 provided through FIG. 8, and thus above description of FIG. 8 are also applicable to FIG. 9, and are incorporated herein by reference. Thus, the above description may not be repeated here.

If gaze information 940 is received, the prediction apparatus may analyze the duration of a fixation of the user on an object estimated to be a recognition target of the user in the gaze sequence in operation 970, at the same time classifying an eye movement pattern according to a gaze sequence included in the gaze information 940 in operation 950. In operation 980, the prediction apparatus may generate a gaze duration weight filter of the user based on the duration of fixation of the user.

In operation 990, the prediction apparatus may predict or determine an object of interest of the user by integrating the location weight filter generated in operation 930, the eye movement association filter generated in operation 960, and the gaze duration weight filter generated in operation 980 and applying the integrated filter to the per-frame segmentation image.

Figure 10:
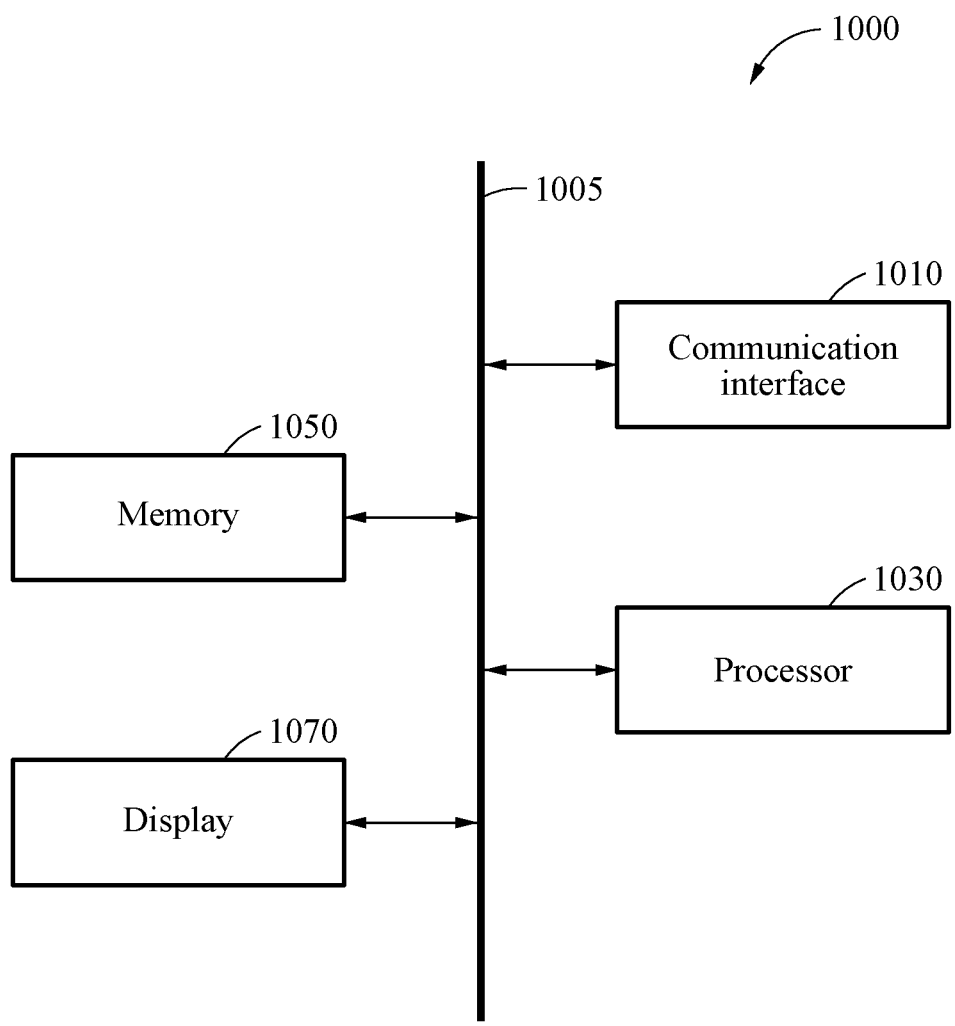
FIG. 10 illustrates an example of an apparatus for predicting an object of interest of a user.

FIG. 10 illustrates an example of an apparatus for predicting an object of interest of a user. Referring to FIG. 10, a prediction apparatus 1000 includes a communication interface 1010, a processor 1030, and a display 1070. The prediction apparatus 1000 may further include a memory 1050. The communication interface 1010, the processor 1030, and the memory 1050 may be connected to each other through a communication bus 1005.

In an example, the communication interface 1010 receives an input image of a visible region of a user and gaze information including a gaze sequence of the user.

The processor 1030 generates a plurality of weight filters to be applied to a per-frame segmentation image by analyzing a frame of the input image for input characteristics of the per-frame segmentation image of the input image and the gaze information. The processor 1030 predicts an object of interest of the user by integrating the plurality of weight filters and applying the integrated weight filter to the per-frame segmentation image.

In an example, the processor 1030 may generate a first filter which is based on a gaze location of the user, based on angle of view information and a foveal point of the user in the per-frame segmentation image. In an example, the processor 1030 may generate a second filter which is based on an eye movement pattern according to the gaze sequence. In an example, the processor 1030 may generate a third filter which is based on a gaze duration of the user, based on a duration of a fixation of the user on an object estimated to be a recognition target of the user in the gaze sequence.

The memory 1050 may store the input image of the visible region of the user and the gaze information including the gaze sequence of the user. The memory 1050 may store the plurality of weight filters generated by the processor 1030 and the object of interest of the user predicted by the processor 1030.

The communication interface 1010 may output the object of interest of the user predicted by the processor 1030 to the display 1070 or provide the object of interest to another device.

In addition, the processor 1030 may perform the at least one method described with reference to FIGS. 1 through 9 or an algorithm corresponding to the method. The processor 1030 may be a data processing device implemented by hardware including a circuit having a physical structure to perform desired operations. For example, the desired operations may include instructions or codes included in a program. For example, the hardware-implemented prediction apparatus may include a microprocessor, a central processing unit (CPU), a processor core, a multi-core processor, a multiprocessor, an application-specific integrated circuit (ASIC), and a field programmable gate array (FPGA), a graphics processor unit (GPU), or any other type of multi- or single-processor configuration. Further details regarding the processor 1030 is provided below.

The processor 1030 may execute the program and control the prediction apparatus 1000. Program codes to be executed by the processor 1030 may be stored in the memory 1050.

The memory 1050 may store a variety of information generated in the processing process of the processor 1030 described above. In addition, the memory 1050 may store a variety of data and programs. The memory 1050 may include a volatile memory or a non-volatile memory. The memory 1050 may include a large-capacity storage medium such as a hard disk to store a variety of data. Further details regarding the memory 1050 is provided below.

The display 1070 displays the object of interest of the user predicted by the processor 1030. The display 1070 is a physical structure that includes one or more hardware components that provide the ability to render a user interface, render a display, and/or receive user input. The display 1070 is not limited to the example described above, and any other displays, such as, for example, computer monitor and eye glass display (EGD) that are operatively connected to the prediction apparatus 1000 may be used without departing from the spirit and scope of the illustrative examples described. In an example, the display 1070 is a physical structure that includes one or more hardware components that provide the ability to render a user interface, render a display, and/or receive user input.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of playing back an image on a head-up display (HUD) device. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of predicting an object of interest, the method comprising:
    receiving an input image of a visible region of a user and gaze information including a gaze sequence of the user;
    generating any two or any combination of weight filters comprising:
        a first filter based on a gaze location of the user, which is based on angle of view information and a foveal point of the user in a per-frame segmentation image by analyzing a frame of the input image,
        a second filter based on an eye movement of the user, which is based on an eye movement pattern according to the gaze sequence, and
        a third filter based on a gaze duration of the user, which is based on a duration of a fixation of the user on an object estimated to be a recognition target of the user in the gaze sequence; and
    predicting an object of interest of the user by integrating the any two or any combination of the weight filters and applying the integrated weight filter to the per-frame segmentation image.

2. The method of claim 1, wherein the generating of the first filter comprises:
    distinguishing a first region corresponding to a fovea and a second region corresponding to a parafovea in the per-frame segmentation image, based on the angle of view information and the foveal point of the user in the per-frame segmentation image; and
    generating the first filter by assigning different weights to a class estimation probability of a pixel in the first region and a class estimation probability of a pixel in the second region.

3. The method of claim 2, wherein the distinguishing comprises distinguishing whether each pixel of the per-frame segmentation image belongs to the first region or the second region.

4. The method of claim 2, wherein the generating of the first filter by assigning different weights comprises generating the first filter by assigning the different weights to the class estimation probability of the pixel in the first region and the class estimation probability of the pixel in the second region, considering a distribution form of human visual receptors.

5. The method of claim 2, wherein the generating of the first filter by assigning different weights comprises:
    assigning a first weight to a class estimation probability of a first pixel corresponding to the first region; and
    assigning a second weight to a class estimation probability of a second pixel corresponding to the second region,
    wherein the first weight is greater than the second weight.

6. The method of claim 1, wherein the generating of the second filter comprises generating the second filter based on an association between a classification result of the eye movement pattern according to the gaze sequence and a visual form of the object estimated to be the recognition target of the user.

7. The method of claim 6, wherein the eye movement pattern comprises any one or any combination of a fixation pattern in which a gaze of the user is fixated to the object, a saccade pattern in which the gaze of the user quickly moves from a first fixation point to a second fixation point spaced apart therefrom, and a pursuit pattern in which the gaze of the user pursues the object.

8. The method of claim 6, wherein the generating of the second filter comprises:
   generating the second filter by assigning a different weight to the object for each eye movement pattern, based on at least one of the visual form of the object estimated to be the recognition target of the user or a type of information contained in the object.

9. The method of claim 8, further comprising classifying the gaze sequence for each eye movement pattern through a time series analysis on the gaze sequence.

10. The method of claim 8, wherein the generating of the second filter by assigning the different weight to the object comprises
   generating the second filter by assigning a different weight to a class estimation probability of the object for each eye movement pattern, based on at least one of the visual form of the object or the type of information contained in the object in the per-frame segmentation image.

11. The method of claim 2, wherein the generating of the third filter comprises:
   analyzing the duration of the fixation of the user on the object for each eye movement pattern according to the gaze sequence through a time series analysis on the gaze sequence; and
   generating the third filter by assigning a different weight to the object, based on an information acceptability of the user according to the visual form of the object and the duration of the fixation of the user for each eye movement pattern.

12. The method of claim 1, wherein the integrating of the at least two filters comprise integrating the at least two filters from among the any two or any combination of the weight filters using an element-wise multiplication operation.

13. A non-transitory computer-readable storage medium storing instructions that, when executed by a processor, cause the processor to perform the method of claim 1.

14. An apparatus for predicting an object of interest, the apparatus comprising:
   a communication interface configured to receive an input image of a visible region of a user and gaze information including a gaze sequence of the user; and
   a processor configured to generate any two or any combination of weight filters comprising
      a first filter based on a gaze location of the user, which is based on angle of view information and a foveal point of the user in a per-frame segmentation image by analyzing a frame of the input image,
      a second filter based on an eye movement of the user, which is based on an eye movement pattern according to the gaze sequence, and
      a third filter based on a gaze duration of the user, which is based on a duration of a fixation of the user on an object estimated to be a recognition target of the user in the gaze sequence; and
   the processor is further configured to predict an object of interest of the user by integrating the any two or more or any combination of the weight filters and to apply the integrated weight filter to the per-frame segmentation image.

15. The apparatus of claim 14, wherein the processor is further configured to distinguish a first region corresponding to a fovea and a second region corresponding to a parafovea in the per-frame segmentation image, based on the angle of view information and the foveal point of the user in the per-frame segmentation image, and to generate the first filter by assigning different weights to a class estimation probability of a pixel in the first region and a class estimation probability of a pixel in the second region.

16. The apparatus of claim 14, wherein the processor is further configured to generate the second filter based on an association between a classification result of the eye movement pattern according to the gaze sequence and a visual form of the object estimated to be the recognition target of the user.

17. The apparatus of claim 14, wherein the processor is further configured to analyze the duration of the fixation of the user on the object for each eye movement pattern according to the gaze sequence through a time series analysis on the gaze sequence, and to generate the third filter by assigning a different weight to the object, based on an information acceptability of the user according to the visual form of the object and the duration of the fixation of the user for each eye movement pattern.

18. A method of predicting an object of interest, the method comprising:
   receiving an image of a region visible to a user and gaze information of the user;
   determining a segmentation image from a frame of the image;
   generating a first filter based on a foveal point and an angle of view information of the user in the segmentation image;
   generating a second filter based on the gaze information comprising a gaze sequence indicating eye movements of the user over time;
   generating a third filter based on the gaze information comprising a duration of fixation of the gaze of the user on an estimated object of interest of the user;
   predicting an object of interest of the user by integrating any two or more or any combination of the first filter, the second filter, and the third filter and applying the integrated filter to the segmentation image.

19. The method of claim 18, wherein the generating of the first filter comprises:
   determining, based on the angle of view information and the foveal point of the user in the segmentation image, a first region corresponding to a fovea and a second region corresponding to a parafovea in the segmentation image; and
   assigning a first weight to a class estimation probability of a first pixel corresponding to the first region that is greater than a second weight assigned to a class estimation probability of a second pixel corresponding to the second region.

20. The method of claim 18, wherein the gaze information further comprises any one or any combination of a gaze trajectory, a velocity during the eye movements, a coverage of the fixation of the gaze, a time at which the gaze sequence is acquired, and a sampling frequency at the time at which the gaze sequence is acquired.

* * * * *